United States Patent Office 2,705,709
Patented Apr. 5, 1955

2,705,709

AZO ANTHRAQUINONE VAT DYESTUFFS

Eduard Moergeli, Basel, Switzerland, assignor to Ciba Limited, Basel, Switzerland, a Swiss firm No Drawing. Original application December 17, 1951, Serial No. 262,173. Divided and this application May 28, 1954, Serial No. 433,306

Claims priority, application Switzerland June 3, 1949

6 Claims. (Cl. 260—207.1)

This application is a division of my copending application Serial No. 262,173, filed on December 17, 1951, which itself is a continuation in part of my application Serial No. 100,298, filed June 20, 1949, now abandoned.

The present invention is based on the observation that valuable vat dyestuffs are produced when one molecular proportion of an acylating agent derived from an azobenzene dicarboxylic acid or from an azodiphenyl dicarboxylic acid is reacted with two molecular proportions of 1-amino-5-(2'-fluorobenzoylamino)-anthraquinone, 1-amino-5-(4'-chloro-2'-fluorobenzoylamino)-anthraquinone or 1-amino-5-(5'-chloro-2'-fluorobenzoylamino)anthraquinone.

Accordingly the new dyestuffs correspond to the formula

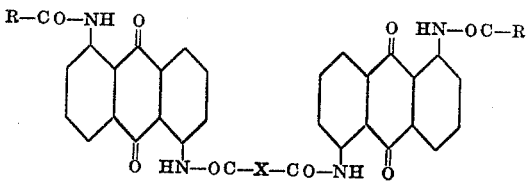

wherein X stands for a member selected from the group consisting of an azobenzene radical and an azo diphenyl radical and R stands for a member selected from the group consisting of the radicals corresponding to the formulae

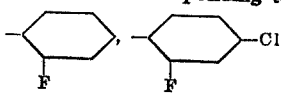

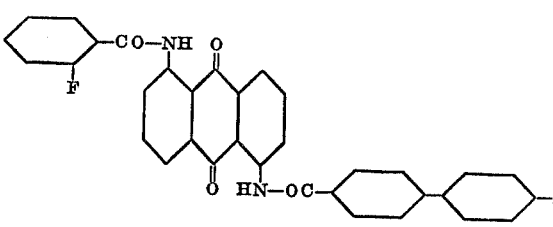

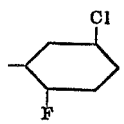

1-amino-5-(4'- or 5'-chloro -2'- fluorobenzoylamino)-anthraquinone can be prepared by monoacylation of 1:5-diaminoanthraquinone. The 2-fluoro-4- or 5-chloro-benzoic acid which are necessary for introducing the corresponding acyl radicals can be made by methods in themselves known. A suitable method for preparing such compounds consists, for example, in diazotizing 1-amino-2-methyl-4- or -5-chlorobenzene with the aid of hydrofluoric acid and sodium nitrite, the appropriate fluorine substitution product being formed either simultaneously with diazotization by the action of the hydrofluoric acid or by subsequent conversion of the diazo compound into the fluorine substitution product with the splitting off of nitrogen. In the resulting 1-fluoro-2-methyl-4- or -5-chlorobenzene the methyl group is either oxidized directly to a carboxylic acid group or converted into a trichloromethyl group followed by hydrolysis of the latter to a carboxylic acid group.

The 1 - amino-5-(2'-fluorobenzoylamino) - anthraquinone or 1-amino-5-(2'-fluoro-4' or -5'-chlorobenzoylamino)-anthraquinone is acylated with acylating agents derived for example from 1:1'-azobenzene-3:3'- or -4:4'-dicarboxylic acid or azodiphenyl dicarboxylic acids.

In all cases it is of advantage to carry out the acylation with the aid of reactive derivatives of the carboxylic acids in question. The reaction may be conducted in a solvent or dispersing medium, advantageously of high boiling point such as mono-, di- or tri-chlorobenzene, nitrobenzene or naphthalene at a raised temperature, for example, within the range from about 100° C. to the boiling point of the solvent or dispersing medium used.

The products of the invention are valuable vat dyestuffs. They can be used in known manner as such or in form of their leuco-ester salts obtainable by known methods for dyeing and printing a very wide variety of fibers of animal and especially vegetable character, thus wool and silk, but especially cotton, linen, and artificial silk or staple fibers or regenerated cellulose and also superpolyamide fibers.

The following examples illustrate the invention the parts and percentages being by weight unless otherwise stated and the relationship of parts by weight to parts by volume being the same as that of the kilogram to the liter:

Example 1

A mixture of 4.22 parts of azodiphenyl-dicarboxylic acid of the formula

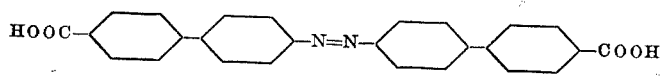

16 parts of thionyl chloride, 0.05 part of pyridine and 290 parts of trichlorobenzene is heated in about 2 hours from 80° C. to boiling temperature. Then 60 parts of the solvent are distilled off and 7.5 parts of 1-amino-5-(2'-fluorobenzoylamino)-anthraquinone are added at about 100° C. and the whole is heated again to boiling and kept at this temperature for 2 hours while stirring. The difficultly soluble dyestuff of the formula

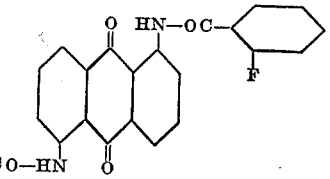

is filtered off at 120° C. and washed with alcohol. It is soluble in concentrated sulfuric acid with an orange coloration and dyes cotton from a bordeaux colored hydrosulfite vat in very fast full yellow shades.

When instead of azodiphenyl-dicarboxylic acid an equivalent quantity of 1:1'-azobenzene-4:4'-dicarboxylic acid is used, a dyestuff is obtained which also dyes cotton full yellow tints from a ruby red hydrosulfite vat. With 1:1'-azobenzene-3:3'-dicarboxylic acid there is obtained a dyestuff which dyes cotton from a ruby red hydrosulfite vat pure yellow shades. The 1-amino-5-(2'-fluorobenzoylamino)-anthraquinone employed can be obtained by partial acylation of 1:5-diamino-anthraquinone with the ortho-fluorobenzoyl chloride or from 1-chloro-5-(ortho-fluorobenzoylamino)-anthraquinone by replacement of the chlorine atom by the toluene sulphonamide residue and splitting off of the sulphonic acid residue. It crystallizes from pyridine or nitrobenzene in fine red crystals which melt at 269.5–270° C. (uncorrected).

*Example 2*

A mixture of 0.99 part azobenzene - 4:4' - dicarboxylic acid 6 parts of thionyl chloride, 0.05 part of pyridine and 90 parts of trichlorobenzene is stirred for 30 minutes at 80° C. and for a further 30 minutes at 120° C., and is then heated at the boil, whereupon thionyl chloride and some of the solvent distil off. The solution is allowed to cool to 100° C., 3 parts of 1-amino-5-(2'-fluoro-4'-chlorobenzoylamino)-anthraquinone are added, and the whole is heated for 2 hours at 200–210° C. After cooling to about 120° C. the dyestuff of the formula

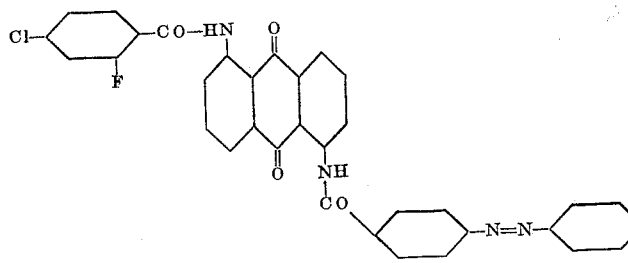

is separated by filtration. It dissolves in concentrated sulfuric acid with a red coloration and dyes cotton fast yellow tints.

By methods exactly analogous to those described in the foregoing examples there can be obtained from two molecular proportions of the 1 - amino - 5-acylaminoanthraquinone given in column I of the following table and 1 molecular proportion of the adjacent dicarboxylic acid in column II, further dyestuffs having the properties given in columns III and IV. The dicarboxylic acid is advantageously used in the form of the dichloride.

| | I<br>Anthraquinone component, 2 mols | II<br>Acid component, 1 mol | III<br>Dyeing on cotton | IV<br>Color of the hydrosulfite vat |
|---|---|---|---|---|
| 1 | 1-amino-5-(2'-fluoro-4'-chlorobenzoylamino) - anthraquinone. | azobenzene-3:3'-dicarboxylic acid. | full yellow | bordeaux red. |
| 2 | 1-amino-5-(2'-fluoro-5' - chlorobenzoylamino) - anthraquinone. | do | do | bordeaux. |
| 3 | do | azodiphenyl - dicarboxylic acid.[1] | golden yellow | Do. |

[1] Of the formula 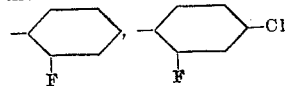

The 1-amino-5-(4'-chloro-2'-fluorobenzoylamino)- anthraquinone used (melting point 279° C.) can be made by the partial acylation of 1:5-diaminoanthraquinone with 2-fluoro-4-chlorobenzoyl chloride, or from 1-chloro-5-(4'-chloro-2'-fluorobenzoylamino)-anthraquinone by replacing the chlorine atom by a toluene sulfonamide radical followed by splitting off of the sulfonic acid radical. 1-amino-5-(5'-chloro - 2' - fluorobenzoylamino) - anthraquinone (melting point 269° C.) can be made in the same manner.

2-fluoro-4-chlorobenzoyl chloride (boiling at 105–106° C. under 14 mm. pressure) can be made from 2-fluoro-4-chlorobenzoic acid (melting point 205° C.) by reaction with thionyl chloride.

The 2-fluoro-4-chlorobenzoic acid can advantageously be prepared by the oxidation with potassium permanganate of 2-fluoro-4-chlorotoluene (boiling at 158° C. under 743 mm. pressure), which latter can be obtained from 2-amino-4-chloro-toluene by the hydrofluoboric acid method of Balz and Schiemann (Berichte der deutschen Chemischen Gesellschaft, vol. 60, page 1188 (1927)) in excellent yield. In an analogous manner 2-fluoro-5-chlorobenzoyl chloride (boiling at 103–104° C. under 15 mm. pressure) can be obtained from 2-amino-5-chloro-toluene by way of the intermediate products 2-fluoro-5-chlorotoluene (boiling at 156° C. under 741 mm. pressure) and 2-fluoro-5-chlorobenzoic acid (melting at 149–150° C.).

What is claimed is:
1. An anthraquinone vat dyestuff of the formula

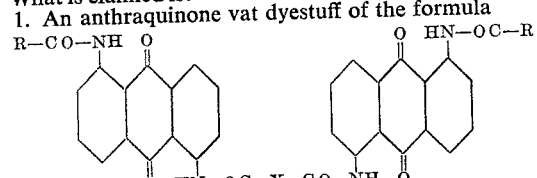

wherein X stands for a member selected from the group consisting of an azobenzene radical and an azo diphenyl radical and R stands for a member selected from the group consisting of the radicals corresponding to the formulae

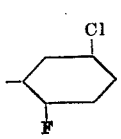

and

2. The anthraquinone vat dyestuff of the formula

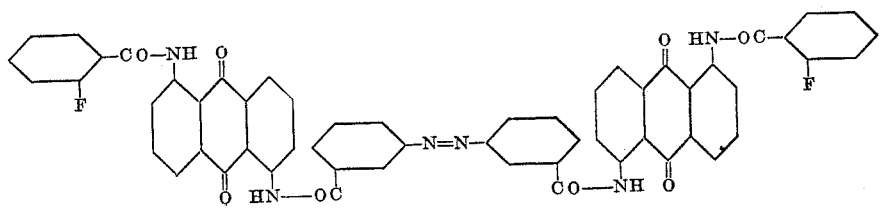

3. The anthraquinone vat dyestuff of the formula
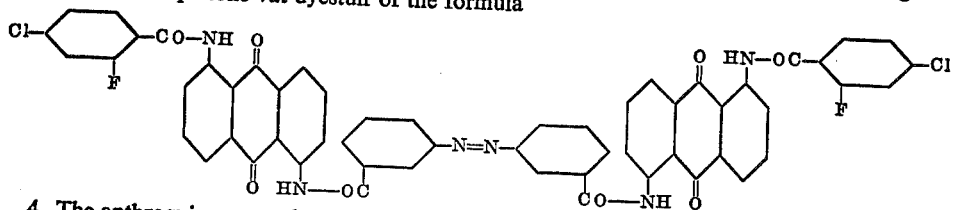
4. The anthraquinone vat dyestuff of the formula
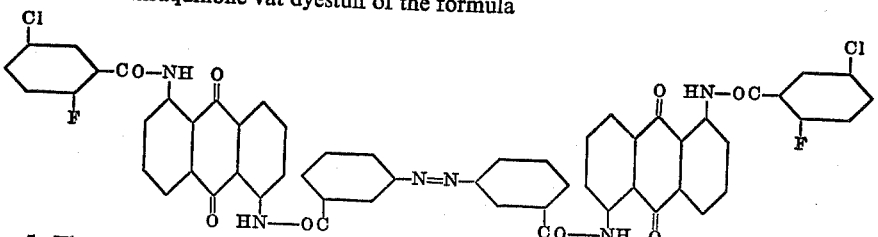
5. The anthraquinone vat dyestuff of the formula
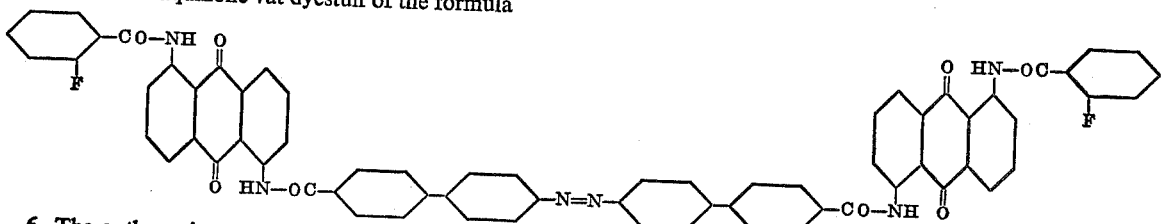
6. The anthraquinone vat dyestuff of the formula
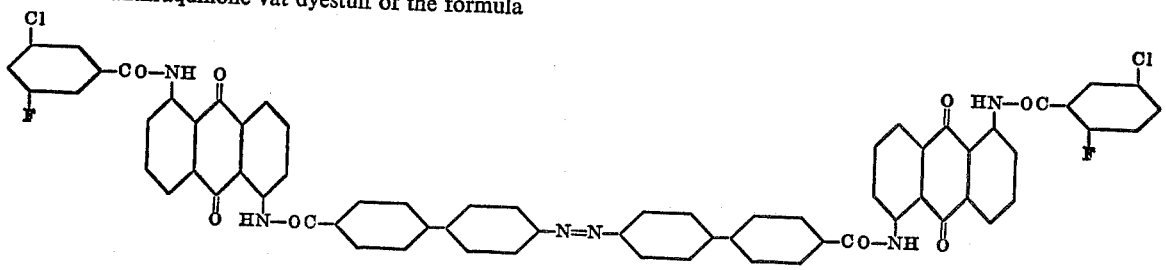
No references cited.